United States Patent Office 3,534,317
Patented Oct. 13, 1970

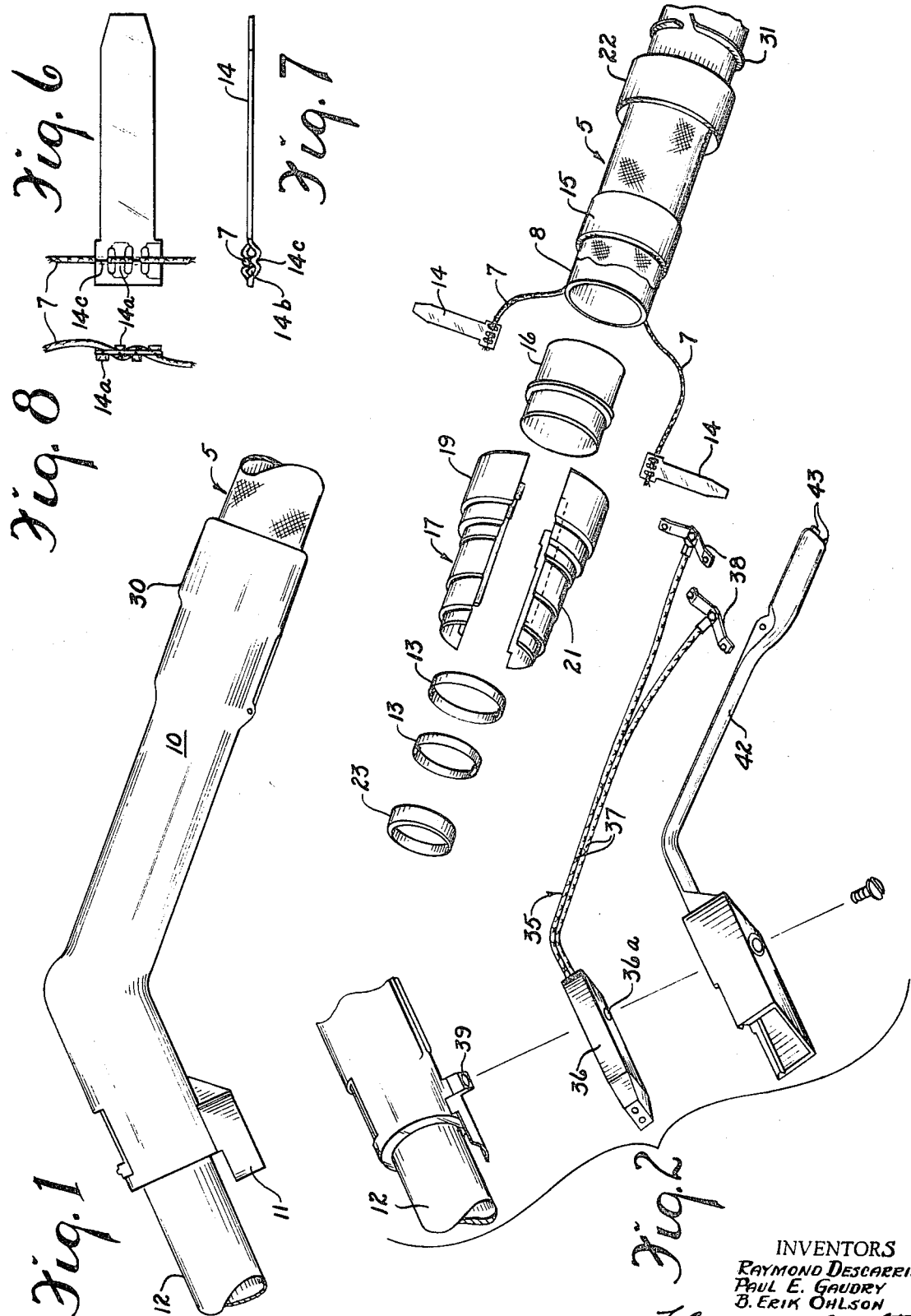

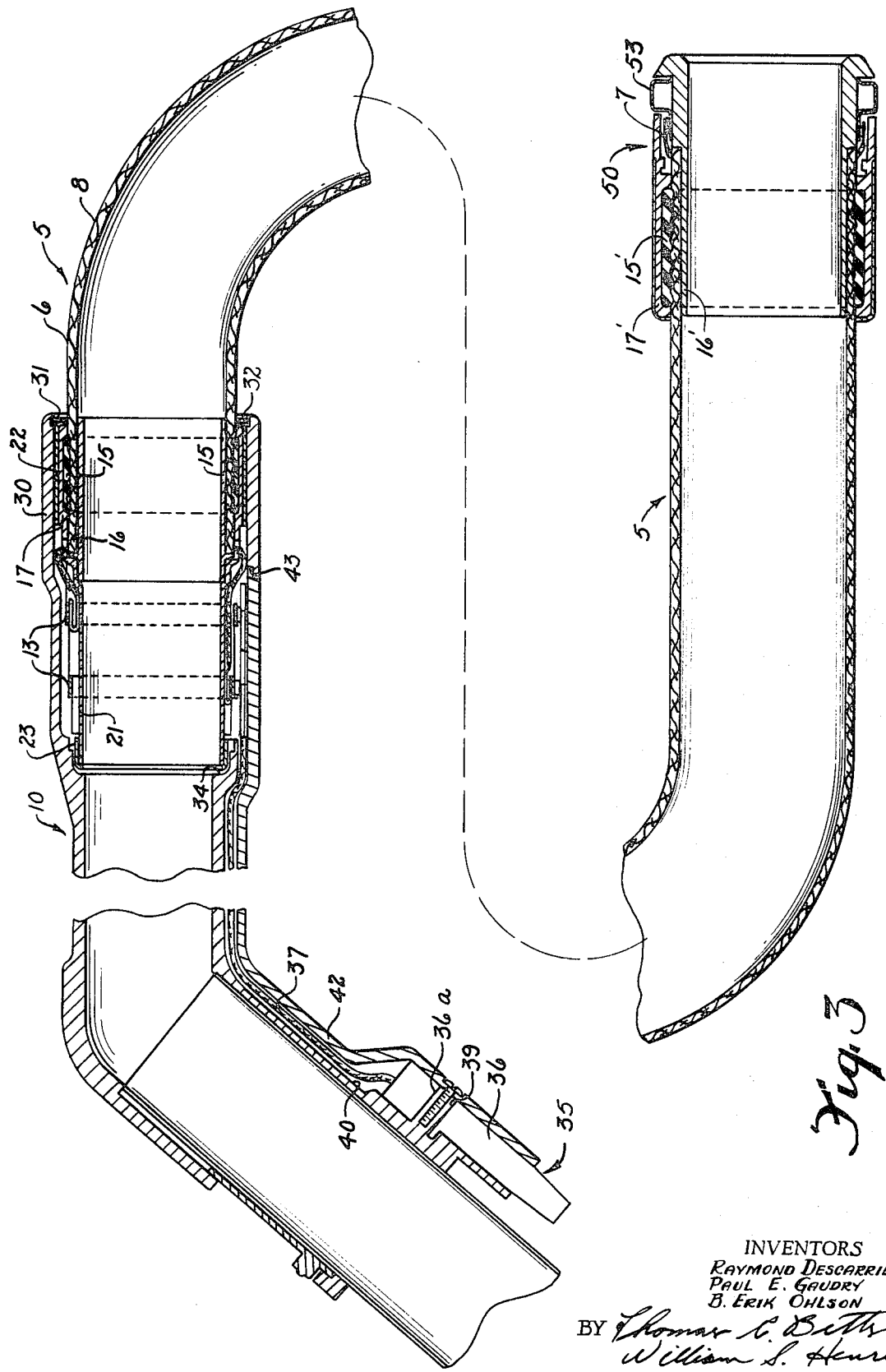

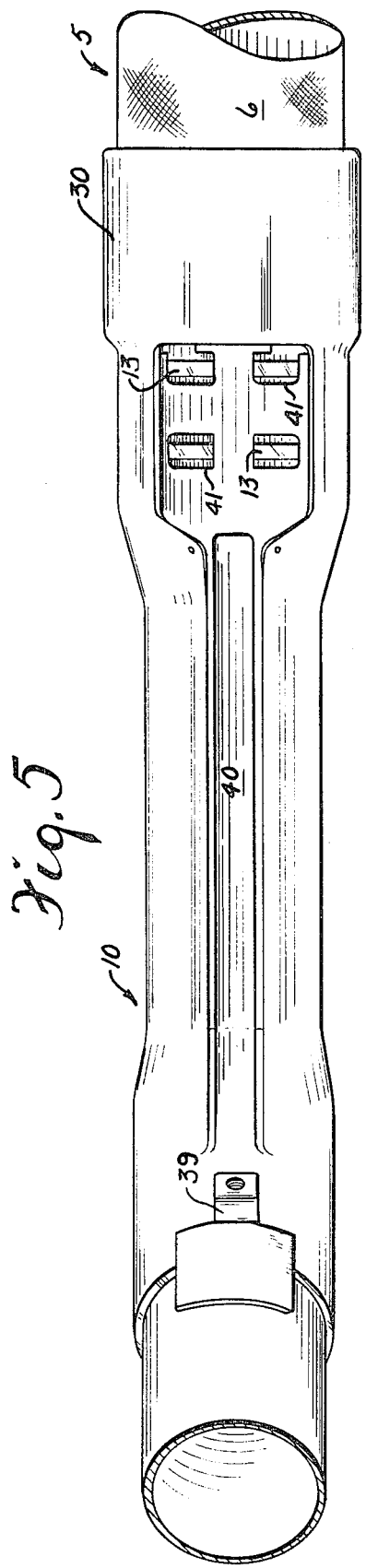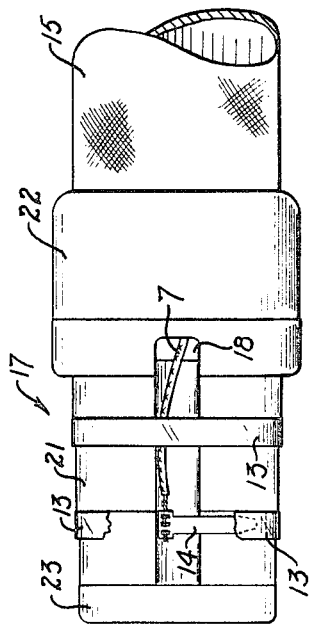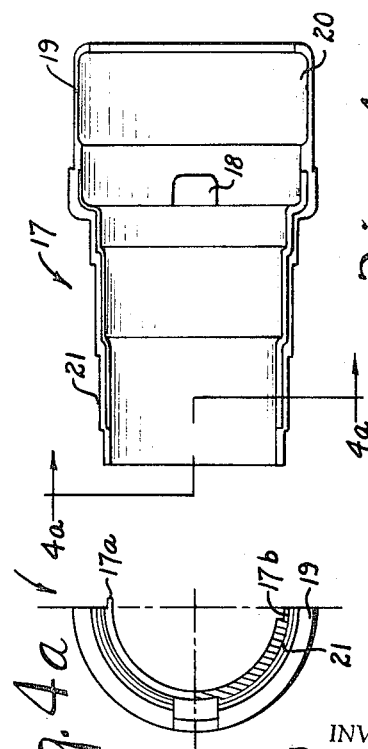

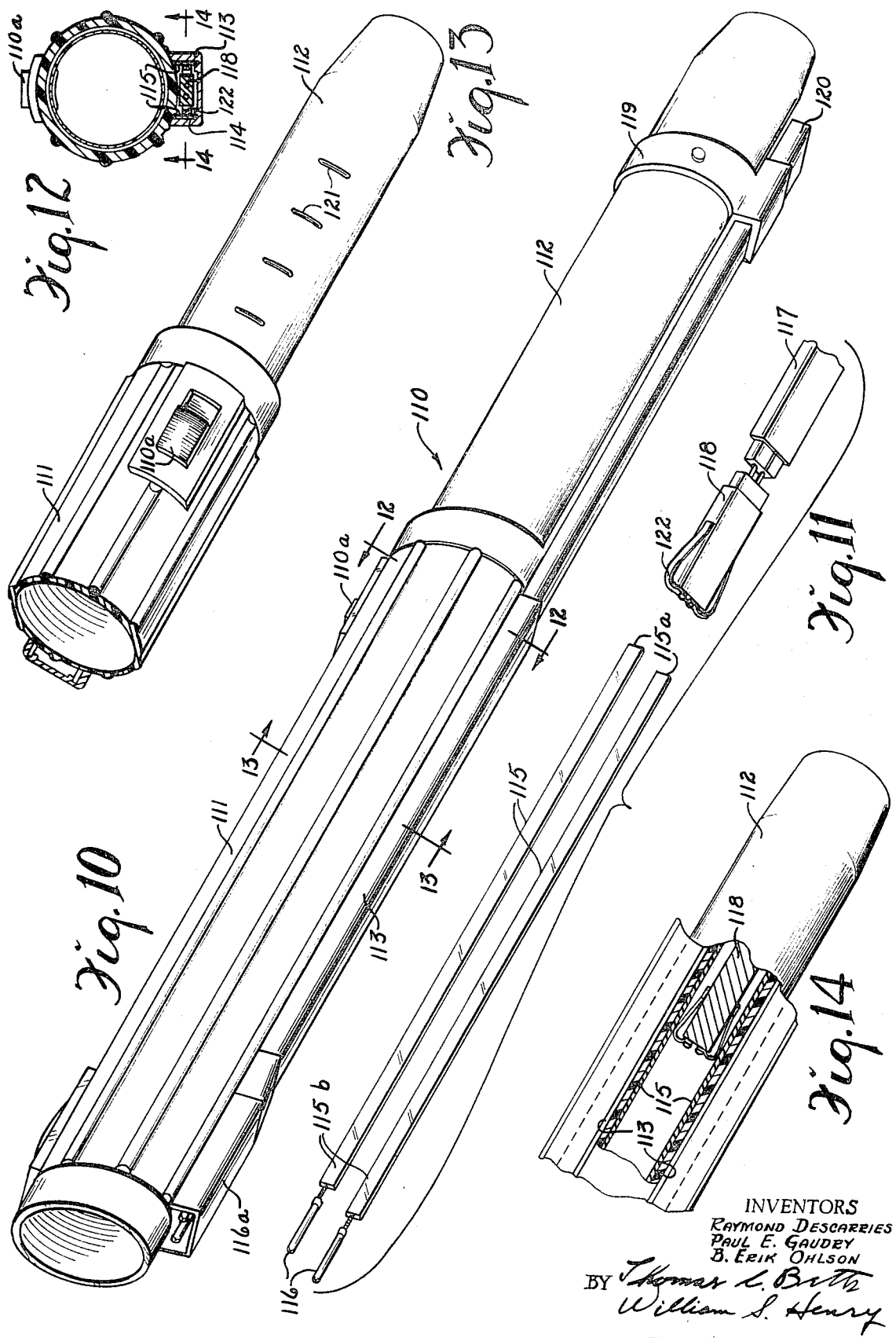

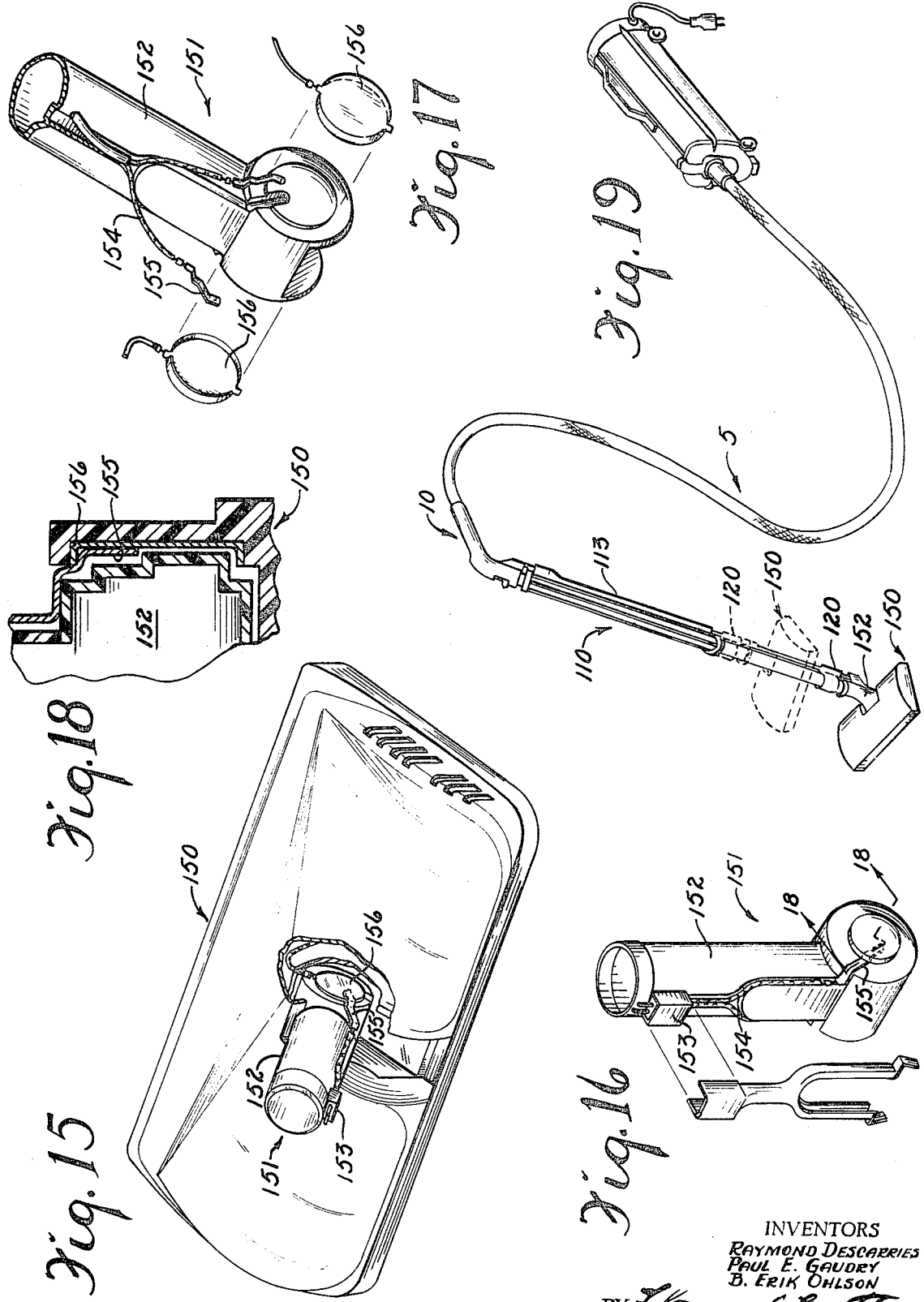

3,534,317
SYSTEM AND APPARATUS FOR ELECTRICALLY CONNECTING A VACUUM CLEANER AND A REMOTE MOTOR DRIVEN BRUSH TOOL
Raymond Descarries, Montreal, Quebec, and Paul E. Gaudry, Laval des Rapides, Quebec, Canada, and Bengt Erik Ohlson, Stamford, Conn., assignors, by mesne assignments, to Consolidated Foods Corporation, Chicago, Ill., a corporation of Maryland
Filed May 20, 1968, Ser. No. 730,306
Int. Cl. H01r 39/00
U.S. Cl. 339—7                                9 Claims

ABSTRACT OF THE DISCLOSURE

A vacuum cleaner hose having electric conductors and end fittings provided with electric terminals in which the fittings are removably connected with the hose by means of an uncured rubber ring clamped radially onto the hose by a pair of sleeves associated with the respective hose end fittings. One hose fitting is adapted for use as a hand grip and is provided with an electric terminal which automatically connects the hose conductors with the conductors of a telescoping wand. The wand is provided with a sliding contact so that in any of its retracted and elongated positions current is conducted to the motorized brush tool removably attached to one end of the wand.

BACKGROUND OF THE INVENTION

A system for electrically connecting a vacuum cleaner and a remote motor driven brush tool and suction nozzle is known from U.S. Pat. 3,177,460 in which the motorized nozzle has a permanently attached rigid wand to which a length of electric cord is connected, and another separate length of cord which is clamped onto the hose, which interconnects the nozzle wand and the cleaner. In order to connect the tool wand and hose the two separate lengths of cord are provided with mating plugs or electric couplings and the electric cord clamped to the hose must be plugged into a receptacle on the cleaner. This system is unsatisfactory because of all the separate connections that are required to complete i.e. physically connecting the cleaner, hose, and tool and also joining the electric plugs of the electric cords, and in addition because the tool wand is not separable and adjustable in length. An improved system is disclosed in U.S. Pat. 3,339,168 in which the hose has integral conductors and the hose end fitting adapted to be inserted in the end cover of the vacuum cleaner automatically connects the hose conductors with a power source within the vacuum cleaner. However, the system associated with the motorized brush suction tool is the same as noted in the first mentioned prior art patent. The improved system according to this invention however relates to the handle fitting at one end of the hose and to the provision of a telescopic electrically conductive wand which is automatically electrically coupled with the hose handle fitting when these two parts are connected, as well as to the powered tool when the wand and tool are connected.

Conducting telescopic wands have been contemplated in which a rotatable storage drum is provided for reeling up and paying out the cord when the length of the wand is adjusted so that a loop of the conductor is not left dangling when the wand is retracted to its shortest length. Also contemplated was a helical coil of the conductor, similar to the familiar coil cord of a telephone connecting the hand set and the base. However, neither of these contemplated wands have become commercially available due to their relatively high cost.

A further feature of the system according to this invention, other than the automatic electric coupling and telescopic electric wand, is the provision of readily removable end fittings for a vacuum cleaner hose having integral conductors. It will be apparent that such a hose is more expensive than the well known vacuum cleaner hose without integral conductors and without end fittings having electric terminal couplings. In view of these relatively expensive components it is desirable to provide a convenient method and apparatus for removing and replacing the hose end fittings for repair purposes which can be made in the field by unskilled persons in a minimum of time. For example, it is well known that vacuum cleaner hose, in normal use over a period of time, is subjected to localized stresses adjacent the end fittings and in particular the hose handle fitting, which cause the hose to fail, however the greater length of hose is serviceable for a much longer period of time. Therefore it is highly desirable to provide hose end fittings which are quickly and easily removed and replaced on the hose after the defective part is removed by unskilled persons working in the owner's home, or a local repair ship without the need for an inventory of a large number of parts. Of course, the replaced hose end fittings must be securely attached to the repaired hose so that they cannot be pulled off in an axial direction under normal conditions since exposing the electrical conductors would be dangerous for the user and subject the manufacturer to liability.

SUMMARY OF THE INVENTION

The improved system of electrically connecting a vacuum cleaner and a remote motor driven brush suction tool according to this invention provides a telescopic electrically conductive wand for a motor driven remote vacuum cleaner suction tool which is automatically electrically connected to the tool and the associated hose end fitting at the same time these elements are physically united.

In addition, the system according to this invention provides an electric hose having end fittings which are easily removed and replaced for repair purposes by virtue of a crude rubber ring which is clamped onto the hose by a split sleeve part of the end fittings.

Therefore, one object of this invention is to provide an improved system for coupling a remote motor driven brush suction tool with an associated vacuum cleaner.

Another object of the invention is to provide a system according to the above object including a telescopic wand provided with electric conductors and a sliding switch interconnecting electric couplings attached to the wand adjacent its ends and adapted to be automatically coupled with an associated tool and a hose end fitting when the wand is physically united with these associated elements.

A further object of the invention is to provide a telescopic electric wand for vacuum cleaning apparatus.

A particular object of the invention is to provide an economically feasible telescopic wand having an elongated slide contact between the wand sections and having an electric cord set with terminals adjacent each end of the wand sections.

Another object of the invention is to provide improved hose end fittings for a vacuum cleaner hose which are readily adapted for removal and replacement.

Another object of the invention is to provide improved hose end fittings for a hose having integral electric conductors which are readily adapted for removal and replacement.

Another object of the invention is to provide an improved pivotal current carrying hose handle for a hose having integral conductors.

A particular object of the invention is to provide electric circuit elements in an electric hose handle fitting which are quickly and easily removed from the handle fitting for replacement or repair and which can be expeditiously connected with conductors of the associated electric hose.

The foregoing objects and additional objects of the invention, and advantages of the subject invention, will be apparent from the following description of a presently preferred embodiment thereof as illustrated in the accompanying drawing.

BRIEF DESCRIPTION OF DRAWING

FIG. 1 is a perspective view of a hose handle according to one aspect of the invention.

FIG. 2 is an exploded view of the hose handle shown in FIG. 1.

FIG. 3 is a cross-sectional view of a length of hose having a hose handle as shown in FIGS. 1 and 2 and a cross-sectional view of a hose fitting at the opposite end of the hose.

FIG. 4 is a detailed plan view showing the interior of a sleeve shown in FIGS. 2 and 3 and FIG. 4a is a view taken line 4a—4a of FIG. 4.

FIG. 5 is a detailed plan view of the hand grip fitting shown in FIGS. 2 and 3.

FIGS. 6, 7 and 8 are enlarged detailed views of a terminal according to the invention and shown in FIG. 2.

FIG. 9 is a plan view, partly broken away, of a subassembly shown in exploded view in FIG. 2 and in the assembled view shown in FIG. 3.

FIG. 10 is a perspective view of a wand according to another aspect of the invention.

FIG. 11 is a schematic exploded view of the sliding contact of the wand shown in FIG. 10.

FIG. 12 is a cross-sectional view taken on line 12—12 of FIG. 10.

FIG. 13 is a partial perspective view having a section taken generally on line 13—13 of FIG. 10.

FIG. 14 is a partial view in cross-section taken generally on line 14—14 of FIG. 12.

FIG. 15 is a partly broken away perspective view of a motor driven brush suction tool having an elbow according to a further aspect of the invention.

FIG. 16 is a perspective view of the elbow per se of the tool shown in FIG. 15.

FIG. 17 is an exploded perspective view of the elbow shown in FIG. 16.

FIG. 18 is an enlarged cross-sectional view taken generally on line 18—18 of FIG. 16.

FIG. 19 is a perspective view on a small scale, of the system according to the invention having the elements disclosed in the foregoing figures of the drawing and coupled with a tank type vacuum cleaner.

DESCRIPTION OF THE PREFERRED EMBODIMENT

Referring to FIGS. 1 to 9 a known electric vacuum cleaner hose, generally designated 5, which is connected to a vacuum cleaner (FIG. 19) at one end, is provided with a hand grip fitting generally designated 10 at its other end. The hose 5 has electric conductors 7 (FIG. 3) built into the hose carcass for example as shown in U.S. Pat. 3,300,571. The hose conductors 7 are connected via the hand grip fitting 10 with the hand grip outlet 11 so that current is provided for a motor driven brush of the suction tool 150 (FIG. 15) when the tube 12 of the hose handle is inserted into the wand (FIG. 10) or into the elbow 151 of the tool (FIG. 15) as shown in FIG. 19. If the handle 10 is to pivot relative to the hose 5 (and vice versa) the hose conductors 7 are connected with slip rings 13 and the outlet 11 is connected with slip ring brushes 38 as explained in greater detail hereinafter.

When the hose 5 and associated handle 10 are in normal use, the cleaner (FIG. 19) is pulled via the handle 10 and hose 5 so that axial stresses must be overcome to prevent relative axial movement between the hose and its end fittings throughout the life of the hose assembly. These stresses are withstood and or absorbed, according to one feature of the invention, by virtue of a crude or uncured rubber ring 15 (FIGS. 2 and 3) which is placed on the hose 5 or is applied in the form of a tape wrapped about the end of the hose, or adjacent to the end of the hose as shown. The ring 15 may be applied over the braided hose cover or jacket 6 as shown in FIG. 3 or the cover 6 can be stripped back and the ring 15 applied directly on the hose carcass 8. The former is preferred however because the results are entirely satisfactory and time is saved when the braid stripping operation is avoided. As seen in FIG. 2 a length of each hose conductor 7 is brought out of the hose carcass 8 for connection with the slip rings 13 and for this purpose a terminal 14 is connected to each of the conductors 7 as will be explained hereinafter in connection with FIGS. 6, 7, 8 and 9.

Referring more particularly to FIG. 2 when the crude rubber ring 15 has been placed on the hose 5, an inner sleeve 16 is inserted into the end of the hose for reinforcing purposes, and a pair of half sleeve members generally designated 17 are placed over the end of the hose, including the ring 15. The free end of the wires 7 and terminals 14 are brought out through openings 18 (FIG. 4) in each sleeve half so that the terminals 14 are located outside the sleeve members 17 approximately 90° from one another. Each sleeve 17 has a clamping section 19 which is provided with a semi-annular recess 20 (FIG. 4) within the interior of the clamping section 19 which receives the crude rubber ring 15. The other end 21 of the sleeve members 17 extends axially beyond the end of hose 5 and when both halves of the sleeve members are placed on the hose, slip rings 13 are mounted on the slip ring support end 21 of the sleeve member 17. The paired sleeve members 17 are held together on the hose by means of an outer bearing sleeve 22 which glides over the outer surface of the clamping sections 19 (FIG. 9) and the other ends 21 of the paired sleeve members 17 are held together by an inner bearing sleeve 23. The metal sleeves 22, 23 are called bearing sleeves because they journal the hose, assembled sleeves 17, and associated slip rings 13, i.e. the subassembly of FIG. 9 for relative angular movement within the barrel 30 of the handle 10 (FIG. 3). It will be clear from the foregoing that bearing sleeves 22 and 23 also hold the two half sleeves 17 together and clamp the sleeve halves on the crude rubber ring 15. Lateral movement of the half sleeves 17 is prevented by any suitable known means such as dovetailed lands and grooves 17a, 17b on abutting faces of the sleeves 17 (FIG. 42). Axial and angular movement of the slip rings 13 on the sleeves 17 is prevented in any suitable known manner.

The subassembly as shown in FIG. 9 and described above (i.e. the half sleeves 17 including the slip rings 13 and bearing sleeves 22, 23 which clamp the sleeves onto the crude rubber ring 15) is inserted into the enlarged cylindrical end or barrel 30 of the handle 10 as shown in FIGS. 3 and 5. A well known split lock spring 31 is received in an annular recess 32 (FIG. 3) so that it bears against the adjacent end of the outer bearing sleeve 22 for holding this hose subassembly against rearward axial movement within the handle 10. Forward axial movement is prevented by shoulder 34 of the handle 10 (FIG. 3) which bears against the inner end of the subassembly or the adjacent end of the bearing sleeve 23.

The manner of connecting the slip rings 13 with the hose conductors 7 is shown in FIG. 9 and details of the terminals 14 are shown in FIGS. 6, 7 and 8. The terminals 14 consist of a thin blade of resilient conductive material, for example Phosphor bronze, having a series of bridge pieces 14a struck from the wide end of the terminal. As seen in FIG. 8 the bridge pieces 14a are struck in opposite directions alternately for defining a channel 14b into which a conductor 7 is inserted. The conductor is attached to the terminal by means of a punch which forms a strengthening rib 14c transversely of both series of bridge pieces projecting from each width side of the terminal. When the terminal 14 and wire 7 are connected and the terminal brought out through the apertures 18 in the split sleeves 17, the terminal 14 is placed circumferentially of the associated sleeve 17 and a slip ring 13 is pushed over the terminal. As stated earlier any suitable known arrangement can be used for holding the slip rings 13 on the sleeves 17.

A harness, generally designated 35, comprises a molded female plug 36 at one end of the harness conductors 37 and a pair of spring contacts or brushes 38, at the other end of the harness conductors 37. The conductors 37 fit in the elongated well 40 in the body of handle 10 (FIG. 5). The harness conductors are connected with the brushes 38 in any suitable manner (by means of soldering or preferably by known solderless connectors). The brushes 38 are received in openings 41 in the handle 10 which open into the well 40 and also into the interior of the body 10. The openings 41 are aligned with the slip rings 13 of the subassembly shown in FIG. 9 for engaging the brushes 38 with the slip rings 13. Any suitable arrangement may be adopted for insuring that the brushes 38 are held against the slip rings 13.

The plug 36 is provided with a bore 36a through which a lug 39 integral with the handle 10 passes. The lug 39 has an internally threaded bore for receiving a screw fastener. A harness cover 42 is fastened at one end to the lug 39 and a pair of engaging tabs 43 at the other end of the cover 42 fit into slots (FIG. 3) provided in the barrel 30 of the handle 10. As shown in FIG. 1 a locking pin 9 is also utilized to hold the cover 42 on the handle 10.

As seen in FIG. 3 the opposite end of the hose has a push connector, generally designated 50 which is also removably attached to the hose by means of a second uncured rubber ring or tape 15' compressed on the hose 5 by means of a split or half sleeve 17' of appropriate configuration. An inner tube 16' is also placed within the hose for reinforcing purposes, and the hose conductors 7 are connected in a known manner with contacts 53. Operation of contacts 53 is disclosed in U.S. Pat. 3,434,092 which is assigned to the assignee hereof. Briefly, however, the contacts 53 are adapted to engage conductive spring fingers (not shown) within the inlet tube (not shown) of the vacuum cleaner thereby connecting the contacts 53 with an electric power source.

A wand generally designated 110 in accordance with a further aspect of the invention, is shown in FIGS. 10 to 14. The wand comprises an outer tubular section 111 of a known insulating synthetic resin material, and an inner metal tube 112 which is slidably supported within the outer tube in a well known manner. The outer tube 111 is provided with a channel 113 which is attached to the tube 111 in a known manner, for example by ultrasonic welding. A pair of conductive strips 115 (FIGS. 11, 12 and 14) which are fixed in the channel 113 by means of recesses 114. The recesses 114 receive the strips 115 so that the strips 115 can be inserted easily into the channel 113 prior to connecting the channel to the outer tubular section 111 of the wand. Corresponding recesses on the body of the outer tube 111 may be provided also to lock the strips securely in place when the channel 113 is connected to the tube 111.

The pins or blades 116 attached to the strips 115 are supported in a suitable plug body 116a which closes off one end of the channel 113. The other end of the channel is closed by a slide contact 118 attached to a rigid cord 117. The rigid cord 117 is supported at one end by the contact collar 119 pinned, riveted or otherwise attached to the metal inner tube 112. A female plug 120 incorporated in the collar 119 is electrically connected (not shown) with the slide 118 via the conductors of the cord 117.

The inner tube 112 is locked against axial separation from the outer tube 111 in any known manner such as a split lock washer (not shown). Once the inner tube 112 is inserted into the outer tube 111 the channel 113 is closed at both ends since the rigid conductor 117 or slide contact 118 cannot be separated from the channel 113 by accident thereby exposing one end of the bare conductive strips 115.

As best shown in FIG. 11 the contact slide 118 carries brushes or spring contacts 122 which are connected with the conductors of the rigid cord 17 as is well known.

When the telescoping wand 110 is assembled as shown in FIG. 10 and extended its full length, the brushes 122 engage the ends 115a of the strip contacts so that the electric plugs 116 and 120 are electrically coupled via the strips 115, spring contacts 122 of the slide contact 118 and rigid conductor 117. When the inner wand section 112 is pushed into the outer wand section 111 the slide contact 118 and rigid conductor 117 are simultaneously moved into the channel 113 with the brushes 122 sliding along the inner surfaces of strips 115. In the fully retracted position of the wand the contact slide 118 resides well within the channel 113 with the brushes 122 engaging the end 115b of the strips. In the retracted position of the wand the end of channel 113 nearest the wand latch 110a is closed by the rigid conductor cord 117 and the collar 119 abuts the adjacent end of the outer tube to form a stop.

As shown in FIG. 13 the metallic inner tube 112 is provided with a series of notches 121 which are engaged by a finger (not shown) on the wand latch 110a, so that the length of the wand can be adjusted to a variety of lengths.

Another aspect of the system according to the invention is illustrated in FIGS. 15–18 wherein a suction tool or nozzle having a motor driven brush is generally designated 150. The nozzle 150 is of known construction except for the elbow generally designated 151, which is pivotally connected thereto in a known manner. The elbow 151 per se which is best shown in FIGS. 16 and 17, comprises a hollow stem 152 which is adapted to receive the tapered end of the wand 110 (FIG. 10) as well as the tapered end of the inner tube 112 of the wand 110 (FIG. 10) as shown in FIG. 19. An appropriate plug 153, which is attached to the stem 152 is coupled with a pair of conductors 154. Each of the conductors 154 is connected to a brush 155 and, as best shown in FIG. 18, each brush engages the inner surface of a collector cup 156. The collector cups 156 are connected with the motor (not shown) of the tool 150 by a length of wire in known manner. It will be apparent from the foregoing description of FIGS. 15 to 18 that the elbow is free to pivot relative to the tool without flexing the conductors 154 attached to the moving elbow. The cups 156 are held against movement by attachment to the tool in a suitable manner.

The system according to the invention, as illustrated in FIG. 19, therefore provides automatic electric connection between the hose 5 and handle 10 (which also allows the hose to pivot within the handle), as well as between the handle 10 and telescopic wand 110 when these elements are physically united, and between the wand plug 120 and the elbow 152 when these elements are physically united.

It will be apparent to those skilled in the art that various modifications can be made in the various elements of the system disclosed above and therefore the foregoing is given by way of example only.

What is claimed is:

1. The combination comprising a fluid conducting hose, end fitting means at least at one end of said hose, a discrete ring of compressible material on said hose adjacent said one end, a pair of split sleeve members for radially compressing said discrete ring, a bearing sleeve overlying said split sleeve members for holding said split sleeve members against radial separation, electrical conductor means integral with said hose, said split sleeve members having an axially extending portion, a pair of axially spaced slip rings on said axial extending portions of said split sleeve members, and means for connecting said slip rings and said hose conductors.

2. The combination according to claim 1 wherein said end fitting means comprises a handle member having an open barrel portion, said barrel portion being adapted for receiving said split sleeve members and assembled slip rings and bearing sleeve members; openings in said barrel portion aligned with said slip rings, and harness means having a pair of brushes extending through said openings for engaging said slip rings, said harness means including a plug connected to said handle adjacent one end thereof.

3. The combination according to claim 2 with the addition of a telescoping wand having an outer tubular wand section and inner tubular wand section, said inner section being adapted to slide within said outer section, channel means connected with said outer wand section, a pair of spaced parallel elongated conductor strips within said channel means, rigid cord conductor means connected with said inner wand section, said rigid cord conductor means being slidable within said channel, and sliding contact means connected with said rigid cord conductor means for engaging said elongated conductor strips.

4. The combination according to claim 3 with the addition of electrical connector means at one end of said channel means coupled with said elongated conductor strips, said rigid cord conductor having a second electric connector means coupled therewith adjacent the end of said rigid cord conductor means remote from said first mentioned electric connector means.

5. The combination according to claim 3 wherein said rigid cord conductor means includes a collar member surrounding said inner wand section, and means for connecting said collar on said inner wand section.

6. The combination according to claim 5 wherein said collar member includes said second electric connector means coupled with said rigid cord conductor means.

7. A telescoping wand comprising an outer tubular wand section and inner tubular wand section, said inner section being adapted to slide within said outer section, channel means connected with said outer wand section, a pair of spaced parallel elongated conductor strips within said channel means, rigid cord conductor means connected with said inner wand section, said cord conductor means being slidable within said channel, and sliding contact means connected with said rigid cord conductor means for engaging said elongated conductor strips.

8. The combination according to claim 7 with the addition of electrical connector means coupled with said elongated conductor strips adjacent one end of said channel means, said rigid cord conductor means including a second electric connector means coupled therewith adjacent the end thereof remote from said first mentioned electric connector means.

9. The combination according to claim 7 wherein said rigid cord conductor means includes a collar member surrounding said inner wand section, and means for connecting said collar on said inner wand section.

References Cited

UNITED STATES PATENTS

| 2,660,457 | 11/1953 | Mallon | 285—7 |
| 3,244,437 | 4/1966 | Belicka et al. | 285—7 |
| 3,339,168 | 8/1967 | Belicka et al. | 339—5 |

MARVIN A. CHAMPION, Primary Examiner

R. A. HAFER, Assistant Examiner

U.S. Cl. X.R.

285—7; 339—15